Nov. 27, 1951 A. C. SCHROEDER 2,576,859

INDICATING TELEVISION IMAGE DISTRIBUTION

Filed Jan. 31, 1950

Inventor

ALFRED C. SCHROEDER

By Olin J. Mitchell

Attorney

Patented Nov. 27, 1951

2,576,859

UNITED STATES PATENT OFFICE 2,576,859

INDICATING TELEVISION IMAGE DISTRIBUTION

Alfred C. Schroeder, Southampton, Pa., assignor to Radio Corporation of America, a corporation of Delaware Application January 31, 1950, Serial No. 141,380

5 Claims. (Cl. 315—24)

This invention relates to a method of and apparatus for indicating the linearity of deflection of an electron beam in a cathode ray tube and particularly, but not necessarily exclusively, to the determination of the distribution of a television image.

The fidelity with which a television image is reproduced upon the luminescent screen of a cathode ray tube is dependent in part upon the linearity with which the electron beam is deflected over the screen, both horizontally and vertically. Any substantial departure from linearity of electron beam deflection causes distortion of the reproduced image which is objectionable if the non-linearity is substantial.

In the past, the linearity of the electron beam deflection has been indicated principally by the use of test patterns which are reproduced upon the cathode ray tube screen from representative video signals. Such test patterns usually include groups of substantially vertical spaced lines and other groups of substantially horizontal spaced lines. The horizontal deflection linearity is determined by observation of the vertical lines and the vertical deflection linearity is determined by observation of the horizontal lines. Any departure from linearity is indicated by irregular spacing and/or non-uniformity of width of the groups of lines. At best, such an indication is only approximate. Furthermore, the groups of lines of the test patterns usually are not distributed over the entire area of the cathode ray tube screen. Consequently, it is not possible to obtain an indication of the deflection linearity in all portions of the image area. Moreover, linearity checking or indicating systems of the type employing the reproduction of a test pattern necessarily requires a video signal generator by means of which to produce the signals representative of the test pattern to be reproduced.

Accordingly, it is an object of the present invention to provide an improved method of and apparatus for indicating simultaneously both the horizontal and vertical electron beam deflection linearity over all portions of the luminescent screen area in which the image is to be reproduced.

Another object of the invention is to provide an improved method of and apparatus for indicating the horizontal and vertical deflection linearity of an electron beam over the luminescent screen of a cathode ray tube without recourse to the generation of, and the reproduction from, video signals representative of a standard test pattern.

Still another object of the invention is to provide an improved method of and apparatus for indicating the deflection linearity of an electron beam over a cathode ray tube screen by means of signals bearing a predetermined relationship to both the horizontal and vertical scanning frequencies.

A further object of the invention is to provide an improved method of and apparatus for indicating the deflection linearity of an electron beam over a cathode ray tube screen wherein diagonal lines extending in two directions are displayed upon the tube screen and in which the deflection linearity is a function of the linearity of the diagonal lines without reference to the spacing between lines.

In accordance with the invention, the electron beam of a cathode ray tube is deflected both horizontally and vertically over the luminescent tube screen at the desired frequencies and in accordance with a predetermined line-by-line pattern. The intensity of the electron beam is modulated by signals bearing a predetermined relation to the frequency of the scanning facilities. In general, one of the frequencies by which the intensity of the electron beam is modulated is substantially equal to the sum of a multiple of the horizontal scanning frequency and a multiple of the vertical scanning frequency. The other intensity modulation frequency is equal substantially to the difference between a multiple of the horizontal scanning frequency and a multiple of the vertical scanning frequency. The relationship between the factors by which the horizontal and vertical scanning frequencies are multiplied is dependent upon the relationship between the horizontal and vertical dimensions of the image area of the luminescent screen which is scanned by the electron beam. In general, the multiplying factors for the horizontal and vertical scanning frequencies are proportional respectively to the horizontal and vertical dimensions of the scanned screen area.

In accordance with one embodiment of the invention, the horizontal scanning frequency is multiplied by a factor which is proportional to the horizontal dimension of the scanned screen area and the vertical scanning frequency is multiplied by a factor which is correspondingly proportional to the vertical dimension of the scanned screen area. From these two multiplied frequencies, there are derived sum and difference frequencies which are impressed upon the intensity modulating facilities of the cathode ray tube.

In accordance with another embodiment of the invention, there are produced by means, such as free running oscillators, two frequencies closely approximating the sum and difference frequencies and these two oscillators are concurrently started at the beginning of each field scansion and stopped at the conclusion of each field scansion.

In either case, the waves derived at the sum and difference frequencies are modified such as by suitable clipping to produce impulses of relatively short time durations which then may be treated substantially in the same manner as video signals and combined with the usual blanking and synchronizing impulses for impression upon the electron beam intensity control facilities of the cathode ray tube.

The novel features that are considered characteristic of this invention are set forth with particularity in the appended claims. The invention itself, however, both as to its organization and method of operation as well as additional objects and advantages thereof will best be understood from the following description taken in connection with the accompanying drawing in which:

Figure 1:
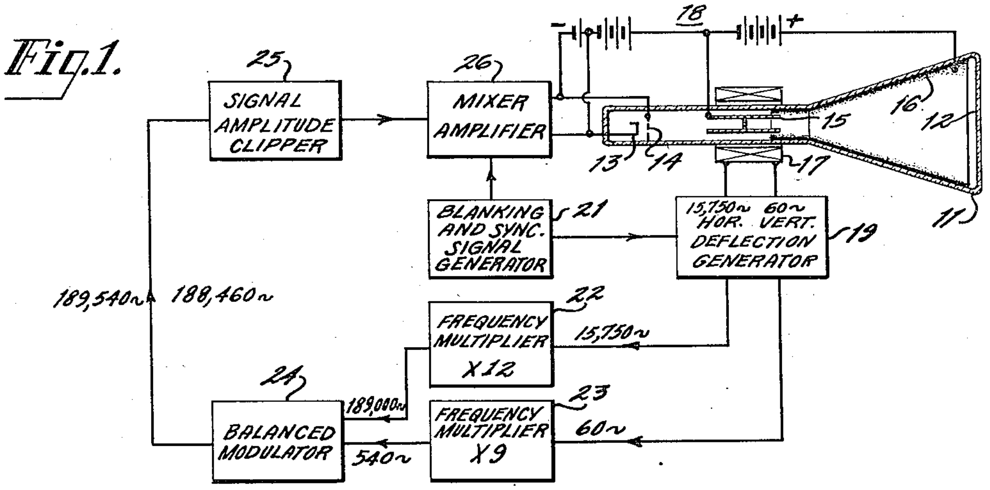
Figure 1 is a block circuit diagram of one embodiment of the invention wherein the sum and difference frequencies are derived from the beam deflection generator.

Having reference now to Figure 1 of the drawing, there is shown a cathode ray tube 11 of conventional design and having a luminescent screen 12 and an electron gun including a cathode 13, a beam intensity control grid electrode 14 and a beam forming or first anode 15. The tube also is provided with a second anode in the form of a wall coating 16. Deflection of the electron beam over the luminescent screen is effected by means of a deflecting system such as an electromagnetic yoke 17.

The electrodes of the cathode ray tube are suitably energized by means of a power supply such as represented by the battery 18. In a conventional manner, the cathode 13 is maintained substantially at ground, or other convenient reference potential, and the intensity control grid 14 is maintained at a slightly negative potential relative to the cathode. Also, the first anode 15 is operated at a potential which is considerably more positive than that of the cathode; while the second anode wall coating 16 is operated at a still higher positive potential.

The electromagnetic deflection yoke 17 is energized by suitable saw-tooth waves derived from a deflection generator 19 of conventional design. While it will be appreciated that the present invention is not necessarily limited for use with systems for effecting deflection of the electron beam at any specific frequencies, for convenience of description it will be assumed that the cathode ray tube 11 is being operated in accordance with the present television standards. In such a case, the horizontal or line deflection of the electron beam is effected at substantially 15,750 cycles per second and the vertical or field deflection of the beam is effected at substantially 60 cycles per second. The horizontal and vertical deflection generator 19 is controlled in the usual manner by means of a conventional blanking and synchronizing signal generator 21.

In accordance with one of the features of this invention, there are derived from the deflection generator 19 two voltage waves at 15,750 cycles per second and 60 cycles per second for impression respectively upon frequency multipliers 22 and 23. Also, in accordance with present television standards, it will be assumed that the area of the luminescent screen which is actively scanned by the electron beam has an aspect ratio of three vertical to four horizontal units. Accordingly, for the purposes of the present invention, it is desired to multiply the horizontal and vertical deflection voltages by factors having the same ratio as the dimensions of the scanned area of the screen. Consequently, the frequency multiplier 22 is of such a character to effect a multiplication of the horizontal deflection frequency by a factor of 12; and, the frequency multiplier 23 is effective to multiply the vertical deflection frequency by a factor of 9. Other factors having a 4 to 3 ratio may be used if different numbers of diagonal lines are desired on the cathode ray tube screen. It will be understood that any suitable type of frequency multiplier may be used for the devices 22 and 23. These may take the forms of multivibrators or conventional Class C amplifiers having anode load circuits resonant at the desired harmonic frequency.

Accordingly, there is derived from the output circuit of the frequency multiplier 22 a voltage wave having a frequency of substantially 189,000 cycles per second, which is twelve times the horizontal deflection frequency. Likewise, the voltage wave derived from the output circuit of the frequency multiplier 23 has a frequency of 540 cycles per second which is nine times the vertical deflection frequency.

The output circuits of the frequency multipliers 22 and 23 are coupled to the input circuit of a balanced modulator 24. The balanced modulator may take any suitable form such as, for example, either of the types shown in the book entitled "Principles of Radio Engineering" by Glasgow, published by McGraw-Hill Book Co., Inc. in Figures 217 and 218 appearing respectively at pages 330 and 332. By means of a balanced modulator of either of these types, there are produced in the output circuit thereof two waves having frequencies equal respectively to the sum and difference of the multiplied horizontal and vertical deflection frequencies. In the assumed case, the sum frequency is substantially 189,540 cycles per second and the difference frequency is substantially 188,460 cycles per second.

The two waves having the described sum and difference frequencies are impressed upon the input circuit of an amplitude clipper 25 which may be in the form of an amplifier biased in such a manner that it is operative only at the peaks or crests of the waves impressed thereon. The sum and difference frequency waves are modified by the clipper 25 so that there is produced in the output circuit thereof two series of impulses of relatively short time duration. One series of impulses is produced at the sum frequency of 189,540 cycles per second and the other series of impulses is produced at the difference frequency of 188,460 cycles per second.

The output circuit of the clipper 25 and the blanking and synchronizing signal generator 21 are coupled to a mixer amplifier 26 for combination to form a composite signal of the same general character as a composite television signal comprising video and blanking and synchronizing components. The mixer amplifier accordingly may be of the same type as the usual line amplifier in a conventional television transmitting station apparatus. In this case, the signal impulses derived from the clipper 25 correspond to the video signal component of a composite television signal.

The output circuit of the mixer amplifier 26 is coupled to the electron beam intensity control electrode system of the cathode ray tube 11 including, in this instance, the cathode 13 and control grid 14. Thus, the intensity of the electron beam is modulated in such a manner that it has a relatively high value at the occurrence of each of the impulses at the sum and difference frequencies of the multiplied horizontal and vertical deflection frequencies. In the time intervals between the occurrence of these impulses, it will be understood that the intensity of the electron beam has a considerably reduced value, which preferably should be below that at which the luminescent screen 12 is excited for the production of light.

Figure 2:
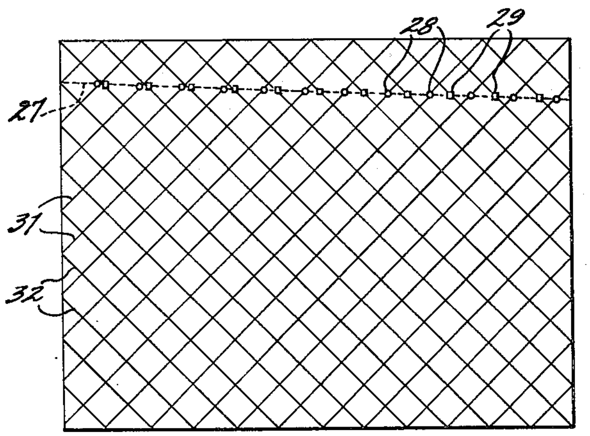
Figure 2 is a representation of the pattern of diagonal lines produced on the luminescent screen of the cathode ray tube; and, Figure 3 is a block circuit diagram of another and somewhat simpler illustrative embodiment of the invention wherein the sum and difference frequencies are derived respectively from two free running oscillators.

By reference now to Figure 2 of the drawing, there will be described the manner in which the diagonal line screen pattern is produced by the modulation of the electron beam by means of the sum and difference frequency impulses while the beam is being systematically deflected over the luminescent screen 12. Consider, for example, any substantially horizontal line 27 in which the electron beam is deflected. In order to more clearly illustrate the manner in which the diagonal pattern is traced upon the screen of the cathode ray tube, the representation in this figure of a typical horizontal line has been grossly exaggerated. At the beginning of this line represented at the left-hand edge of the raster shown in Figure 2, it will be considered that the impulses derived from both the sum and difference frequencies occur simultaneously. As the electron beam is deflected toward the right over the screen along the line 27, the points such as represented at 28 by small circles indicate the position of the electron beam when its intensity is increased under the control of the impulses occurring at the sum or higher frequency. Similarly, the points such as 29 represented by the small squares indicate the positions of the electron beam when its intensity is increased under the control of the impulses occurring at the difference or lower frequency.

It may be seen that, in view of the immediately foregoing description, other points of the luminescent screen are activated for the production of light by the described modulation of the intensity of the electron beam, as succeeding horizontal deflections of it are effected. Consequently, as a result of the described electron beam deflection and intensity modulation, a pattern of diagonal lines such as 31 will be traced upon the cathode ray tube screen under the control of the intensity modulation of the beam by the sum or relatively high frequency impulses. In like manner, the diagonal lines 32 extending in the other direction will be traced as a result of the intensity modulation of the electron beam by the difference or relatively low frequency impulses.

The foregoing description has been based upon the assumption that the deflection of the electron beam over the luminescent screen of the cathode ray tube is substantially linear, both horizontally and vertically. As a consequence, the diagonal pattern displayed upon the screen is entirely regular and symmetrical in all respects. The spacing of both sets of diagonal traces is uniform and the traces themselves are substantially linear. However, if there is any non-linearity, either horizontally or vertically, of the deflection of the electron beam over any part of the screen area, it will be manifested as a distortion of the diagonal pattern traced upon the screen. The distortion will be in the form of a departure from precise linearity of the diagonal lines. Such a display is of a character that any non-linearity of electron beam deflection, which is of a nature and magnitude to cause objectionable distortion of a television image, may be quite readily perceived.

Figure 3:
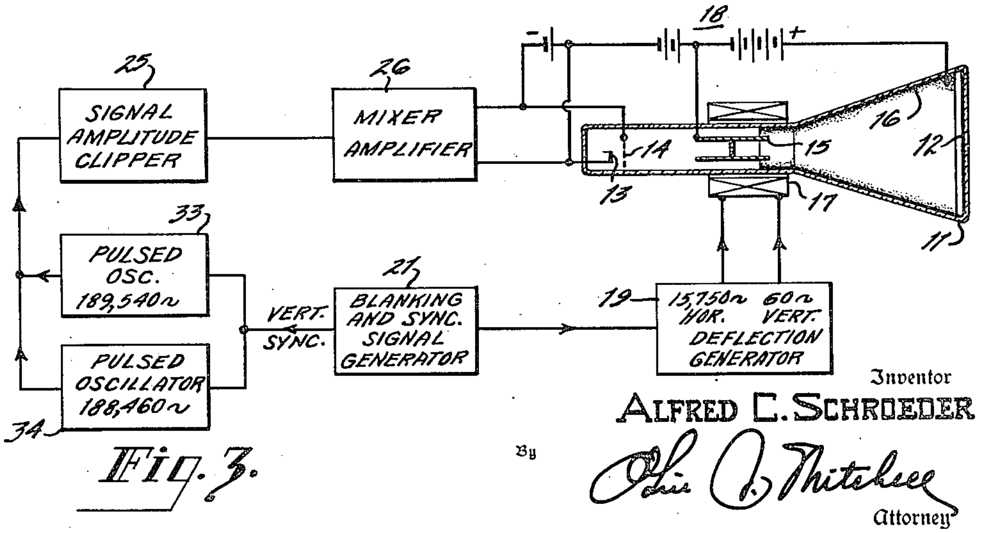

Having reference now to Figure 3 of the drawings, there will be described another embodiment of the invention which, in some respects, is simpler than that shown in Figure 1. Components of this embodiment of the invention which are similar to those shown in Figure 1 are identified by like characters of reference. In this form of the invention, there are provided two pulsed oscillators 33 and 34; the former being capable of developing a voltage wave having a frequency of substantially 189,540 cycles per second and the latter producing oscillations at a frequency of 188,460 cycles per second. It will be noted that these frequencies are the same as those represented by the sum and difference frequencies described in connection with the embodiment of the invention shown in Figure 1. Oscillators of the character required may be of the type shown in the book entitled "Waveforms" published by McGraw-Hill Book Co., Inc. in Figures 4–45 appearing at page 143. The essential requirements of such oscillators are that they have good frequency stability and be susceptible of control by means of timing impulses so that they may be synchronously started and stopped. In this embodiment of the invention, the pulsed oscillators 33 and 34 are coupled to the blanking and synchronizing generator 21 from which the vertical synchronizing signals may be derived for controlling the starting and stopping of the oscillators. It will be understood that the oscillators 33 and 34 are both started together concurrently with the initiation of each field deflection cycle of the electron beam over the luminescent screen of the cathode ray tube. Also, it will be understood that, at the completion of each field scansion, the oscillators 33 and 34 are stopped under the control of the vertical synchronizing signals. Consequently, during each field scansion, the oscillators 33 and 34 are free running to develop their respective frequencies.

The output circuits of the pulsed oscillators 33 and 34 are coupled to the signal amplitude clipper 25 so as to develop the two described series of relatively short impulses for combination in the mixer amplifier 26 with the blanking and synchronizing signals derived from the generator 21. The composite signal developed in the manner described is impressed upon the electron beam intensity control electrode 14 as in the previously described embodiment. The operation of this embodiment is otherwise identical to that previously described and, accordingly, will not be repeated.

It may be seen, therefore, that in accordance with the present invention, there is provided an improved method of and apparatus for indicating simultaneously both the horizontal and vertical electron beam deflection linearity over all portions of the screen area utilized for the reproduction of the image. Furthermore, in accordance with this invention it is not necessary to develop video signals representative of a standard test pattern for the purpose of indicating electron beam deflection linearity. Moreover, the pattern of crossed diagonal lines displayed upon the cathode ray tube screen in accordance with this invention is of such a character that any departure from deflection linearity in any part of the screen area is more readily perceived than in the more conventional test pattern types of display.

The nature of the invention may be ascertained from the foregoing description of two illustrative embodiments thereof, and its scope may be determined by reference to the following claims.

What is claimed is:

1. Apparatus for indicating the horizontal and vertical deflection linearity of an electron beam over a predetermined area of the luminescent screen of a cathode ray tube, comprising means for deflecting said beam at a horizontal deflection frequency and concurrently at a vertical deflection frequency, and means for modulating the intensity of said beam at a first frequency equal substantially to the sum of a multiple of said horizontal deflection frequency and a multiple of said vertical deflection frequency and concurrently at a second frequency equal substantially to the difference of said horizontal and vertical multiple deflection frequencies to produce upon said screen diagonal traces, the linearity of said traces being indicative of the horizontal and vertical beam deflection linearity.

2. Apparatus for indicating the horizontal and vertical deflection linearity of an electron beam over a predetermined area of the luminescent screen of a cathode ray tube, comprising means for deflecting said beam at a horizontal deflection frequency and concurrently at a vertical deflection frequency, means for developing a first series of impulses at a frequency equal substantially to the sum of a multiple of said horizontal deflection frequency and a different multiple of said vertical deflection frequency, means for developing a second series of impulses at a frequency equal substantially to the difference of said horizontal and vertical multiple deflection frequencies, said two multiples being in the same ratio as the horizontal and vertical dimensions of the scanned screen area, and means for modulating the intensity of said beam by said two series of impulses to produce upon said screen diagonal traces in two directions, the linearity of said traces being an indication of the horizontal and vertical beam deflection linearity.

3. Apparatus for indicating the horizontal and vertical deflection linearity of an electron beam over a predetermined area of the luminescent screen of a cathode ray tube, comprising horizontal and vertical deflection systems for said cathode ray tube to deflect said beam at predetermined horizontal and vertical frequencies, respectively, means for increasing said horizontal deflection frequency by a factor corresponding to the horizontal dimension of the scanned screen area, means for increasing said vertical deflection frequency by a factor corresponding to the vertical dimension of the scanned screen area, means coupled to said two frequency increasing means for producing the sum and difference frequencies of said increased horizontal and vertical frequencies, and an electron beam intensity control electrode system for said cathode ray tube coupled to said sum and difference frequency producing means for modulating said beam at said sum and difference frequencies.

4. Apparatus for indicating the horizontal and vertical deflection linearity of an electron beam over a predetermined area of the luminescent screen of a cathode ray tube, comprising a horizontal deflection generator operating at the horizontal deflection frequency, a vertical deflection generator operating at the vertical deflection frequency, horizontal and vertical deflection systems for said cathode ray tube coupled respectively to said horizontal and vertical deflection generators, a horizontal frequency multiplier coupled to said horizontal deflection generator for increasing the frequency of said horizontal deflection frequency by a factor corresponding to the horizontal dimension of the scanned screen area, a vertical frequency multiplier coupled to said vertical deflection generator for increasing the frequency of said vertical deflection frequency by a factor corresponding to the vertical dimension of the scanned screen area, means including a balanced modulator coupled to said frequency multipliers for producing impulses at the sum and difference frequencies of said multiplied horizontal and vertical frequencies, and an electron beam intensity control electrode system for said cathode ray tube coupled to said balanced modulator for modulating said beam under the control of said impulses.

5. Apparatus for indicating the horizontal and vertical deflection linearity of an electron beam over a predetermined area of the luminescent screen of a cathode ray tube, comprising a horizontal deflection generator operating at the horizontal deflection frequency, a vertical deflection generator operating at the vertical deflection frequency, a blanking and synchronizing signal generator coupled to said horizontal and vertical deflection generators for coordinating said deflection frequencies, horizontal and vertical deflection systems for said cathode ray tube coupled respectively to said horizontal and vertical deflection generators, a horizontal frequency multiplier coupled to said horizontal deflection generator for increasing frequency of said horizontal deflection frequency by a factor corresponding to the horizontal dimension of the scanned screen area, a vertical frequency multiplier coupled to said vertical deflection generator for increasing the frequency of said vertical deflection frequency by a factor corresponding to the vertical dimension of the scanned screen area, a balanced modulator coupled to said frequency multipliers for producing the sum and difference frequencies of said multiplied horizontal and vertical deflection frequencies, a signal amplitude clipper coupled to said balanced modulator to develop impulses of relatively short time duration at said sum and difference frequencies, a signal mixing amplifier coupled to said clipper and to said blanking and synchronizing signal generator to develop a composite signal including said impulses and blanking signals, and an electron beam intensity control electrode system for said cathode ray tube coupled to the output circuit of said signal mixing amplifier.

ALFRED C. SCHROEDER.

REFERENCES CITED

The following references are of record in the file of this patent:

UNITED STATES PATENTS

| Number | Name | Date |
|---|---|---|
| 2,284,378 | Dome | May 26, 1942 |
| 2,287,415 | Burnett | June 23, 1942 |
| 2,292,045 | Burnett | Aug. 4, 1942 |
| 2,444,651 | Jones et al. | July 6, 1948 |